Figure 1:
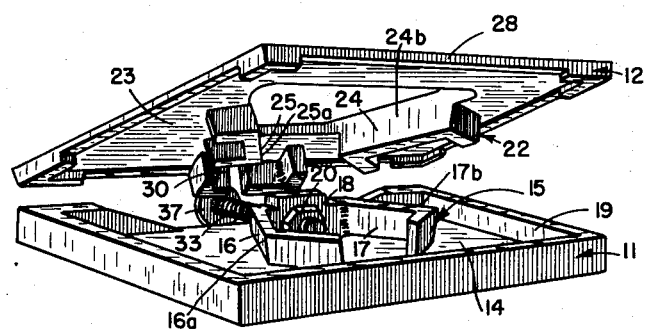

Nov. 29, 1960  A. A. WHITE  2,962,135
MOUNTING DEVICE
Filed Oct. 13, 1958

INVENTOR.
ARTHUR A. WHITE

BY Edward A. Sokolski

AGENT

United States Patent Office 2,962,135
Patented Nov. 29, 1960

2,962,135
MOUNTING DEVICE

Arthur A. White, North Hollywood, Calif., assignor to North American Aviation, Inc.

Filed Oct. 13, 1958, Ser. No. 766,883

7 Claims. (Cl. 189—36)

This invention relates to a mounting device and more particularly to a mounting device comprising two members for rigidly mounting equipment on a support platform.

There are many mounting devices for rigidly mounting equipment. Many of these are especially adapted to mount equipment in moving vehicles such as aircraft. In such an application, the mounting device must generally satisfy the requirement of the ability to withstand extreme shock and vibration without coming loose. In addition to this requirement, the mounted equipment must be readily detachable from the frame on which it is mounted so that it may be removed for replacement or repair. There are many mounting devices which excel in either one or the other of these basic requirements. Generally, however, those providing excellent holding capabilities and the ability to withstand extreme shock and vibration do not satisfy optimum requirements as far as removability are concerned and vice versa.

The device of this invention provides a mounting device which has both excellent holding capabilities and the ability to withstand extreme vibration and shock and in addition is readily attachable and detachable. This is accomplished by utilizing two mounting members, one of these members being fixedly attached to the frame of the vehicle or other support, the other member being fixedly attached to the equipment which is to be mounted. Each of these members has a similar holding portion which extends from one of the member surfaces. These holding portions have sides which are oppositely inclined with respect to the surface from which they extend. These sides further run convergently with respect to each other along axes parallel to the surface from which they extend. Clamping means are provided for clamping the first member to the second member with respective surfaces of corresponding sides of the holding portions being forced into clamping engagement with each other. The clamping means may be in the form of a single screw which operatively engages a nut fixedly attached to one of the mounting members, the head of this screw constraining against an extended portion on the other of the mounting members. Thus the device of this invention provides a simple, rugged mounting device which can readily be attached and detached. It is therefore an object of this invention to provide an improved mounting device.

It is a further object of this invention to provide a mounting device which will hold together under extreme vibration and shock.

It is a still further object of this invention to provide an improved mounting device which will both withstand extreme vibration and shock and which is readily attachable and detachable.

It is a still further object of this invention to provide an improved mounting device for use in vehicles which may be subjected to extreme shock and vibration.

It is still another object of this invention to provide a mounting device which is simple to install and easy to operate.

Figure 2:
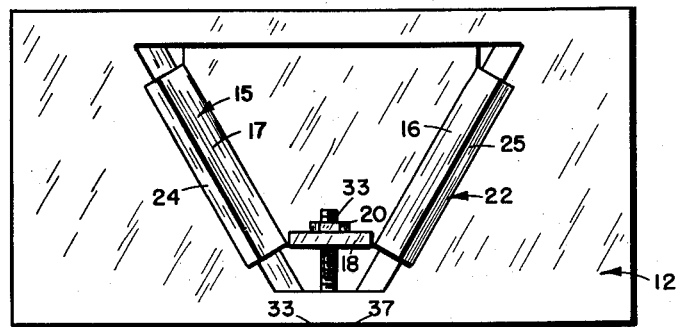
Figure 3:
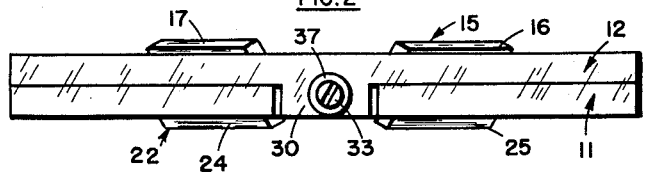

Other objects of this invention will become apparent from the following description taken in connection with the accompanying drawings in which Fig. 1 is an isometric drawing of a first embodiment of the invention, Fig. 2 is a top view of a second embodiment of the invention, and Fig. 3 is a front elevation view of the embodiment of Fig. 2.

Referring to Fig. 1 a first embodiment of the invention in which the load is transmitted at the extreme corners of the mounting device is illustrated. The device comprises a pair of readily detachable members 11 and 12 of which one is to be fixedly secured to a suitable support such as in a vehicle (not shown) and of which the other is to rigidly carry the desired equipment by any suitable means. Mounting member 11 has a holding portion 15 rigidly fixed thereto which extends from one of its surfaces 14. Holding portion 15 has sides 16 and 17 which are oppositely inclined with respect to surface 14 and which run convergently with respect to each other along axes parallel to surface 14. An extension 18 from surface 14 which extends substantially perpendicularly from this surface and which may, as illustrated, be part of holding portion 15 provides a suitable mount for nut 20 which is fixedly attached thereto. As an alternative to the use of nut 20, extension 18 may have a suitable threaded aperture in the location of this nut which like nut 20 will mate with screw 33. Mounting member 11 further has an integral or otherwise rigidly secured rim portion 19 which runs along a substantial portion of the extremities of surface 14 and extends substantially perpendicularly therefrom.

A second mounting member 12 has a similar integral or otherwise rigidly secured holding portion 22 extending from one of its surfaces 23. Holding portion 22 has sides 24 and 25 which are oppositely inclined with respect to surface 23 and which are convergently positioned with respect to each other along axes parallel to surface 23, similarly to the convergent relationship between sides 16 and 17. Side 25 is inclined to form an angle with surface 23 which is the supplement of the angle formed between sides 16 and surface 14, while side 24 is inclined with respect to surface 23 to form an angle which is the supplement of the angle formed between side 17 and surface 14.

It thus can be seen that surface 25a of side 25 will mate with surface 16a of side 16 and surface 24b of side 24 will mate with surface 17b of side 17 when surfaces 23 and 14 are held parallel to each other and drawn together. Practical experience has indicated that inclination angles for the sides of the holding portion with respect to their associated surfaces of about 70 degrees or its supplement, 110 degrees, and angles of convergence of approximately 60 degrees formed between extensions of the sides along axes parallel to their associated surfaces tend to give optimum results with the embodiment illustrated.

Mounting member 12 may have an edge portion 28 which extends perpendicularly from surface 23 and which runs along the extremities of a substantial portion of this surface forming a rim. Such a rim may be provided, as is illustrated in Fig. 1, with corner sections which extend from surface 23 and normal thereto further than the remaining sections of the rim. The use of such raised corner sections tends to transfer the mounted load to these corners and is a factor in providing stability in the mount.

An extension 30 should be provided on mounting member 12 which extends perpendicularly from surface 23. This portion, which may extend further than rim 28, may have an aperture in it through which mounting screw 33 may pass. There is no edge portion on the part of mounting member 11 which is opposite extension 30 when the two mounting members are fitted together so that there is no interference in the path of the extension. A suitable washer 37 may be inserted adjacent to the head (not shown) of screw 33.

When mounting member 12 is fitted over mounting member 11 surface 25a of side 25 will slide against surface 16a of side 16 while surface 24b of side 24 slides against surface 17b of the outer surface of side 17. As screw 33 is tightened in nut 20, washer 37 will force against extension 30, sides 25 and 24 will slide until they are held tightly against sides 16 and 17, respectively, and the raised corner parts of rim 28 will be forced tightly against the corner sections of rim 19, thereby making for tight, stable joinder of mounting members 11 and 12. As screw 33 is tightened, the surfaces of the respective sides of holding portions 22 and 15 are forced together along the axis of the screw. As this force increases holding portion 22 tends to slide toward surface 14 while holding portion 15 slides toward surface 23. The forces thus generated, which tend to move the centers of surfaces 14 and 23 together, appear as increased pressure between the abutting surfaces of the rims of mounting members 11 and 12. Screw 33 need be tightened only to that degree which will result in pressure between mounting members 11 and 12 sufficient to overcome any forces which may be applied to the load to be mounted on one of the mounting members.

Either of the mounting members may be fixedly attached to the frame of the vehicle or other mounting support while the other mounting member is fixedly attached to the equipment to be mounted. The mounted equipment can be removed from the support frame simply by loosening screw 33.

Referring now to Figs. 2 and 3, a second embodiment of the invention in which the mounting members have no edge or rim portions extending therefrom is illustrated. This second embodiment is similar to the first except that the edge or rim portions have been eliminated from the mounting members thereby saving some expense and time in fabrication. Additionally, apertures must be included in mounting member 11 so that holding portion 22 will not abut against surface 14 and will be free to go through this surface. Similarly, mounting member 12 must have an adequately large aperture to permit the passage of holding portion 15. Nonessential parts of holding portions 15 and 22 may be eliminated to facilitate such passage. This second embodiment may not have quite the stability of the first in that its load is not transmitted at the extreme corners of the mounting members. However, as pointed out, it is easier to fabricate and might be successfully used where extreme stability is not too critical a factor.

The device of this invention provides a simple yet efficient mounting device which is easily detachable and which will withstand extreme shock and vibration, actual tests indicating satisfactory operation with the device subjected to accelerations up to 20 times that of gravity.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A mounting device comprising a first member having an edge portion extending substantially perpendicularly from one of the surfaces of said member and forming a rim along the extremities of said surface, a holding portion extending from said surface having at least two sides inclined with respect to said surface and convergent with respect to each other along axes parallel to said surface, said holding portion further having a section thereof joining said two sides, said joining section running substantially perpendicularly from said one surface of said first member, said joining section having a threaded aperture therein, a second member having a holding portion similar to the holding portion of said first member, said second member holding portion having at least two sides inclined with respect to one surface of said second member and convergent with respect to each other in a plane parallel to said one surface, said second member having an extension with an open ended U-shaped aperture therein running perpendicularly from said one surface thereof, and means for clamping said first member to said second member with at least a part of said edge portion being held tightly against a portion of said one surface of said second member and with one of the surfaces of each side of the holding portion on said first member being forced into clamping engagement with the respective surface of a mating side of the holding portion on said second member, said clamping means comprising a screw operatively engaging the threaded aperture of said joining section, the body portion of said screw fitting within said extension aperture.

2. The device as recited in claim 1 wherein the part of said edge portion of said first member held tightly against said one surface of said second member extend from each of the corners of said surface of said first member further than the remaining part of said edge portion.

3. A mounting device comprising a first member having a holding portion extending from one of the surfaces of said member, said holding portion having at least two sides oppositely inclined with respect to said surface and running convergently with respect to each other along axes parallel to said surface, said holding portion further having a section thereof joining said two sides, said joining section running substantially perpendicularly from said one surface, said first member further having a rim portion extending from said one surface and located at least partially along the extremities of said one surface, a second member having a holding portion, said second member holding portion having respective sides oppositely inclined with respect to one of the surfaces on said second member and similarly convergently positioned with respect to each other as corresponding sides of the holding portion of said first member are positioned with respect to said one surface of said first member, said second member having a rim portion extending from said one surface of said second member and located at least partially along the extremities of said surface, a nut mounted on said joining section of said first member, and a screw operatively engaging said nut, the rim portion of said second member having an open ended U-shaped aperture therein, the body portion of said screw fitting through the aperture, the head of said screw constraining against the part of the rim portion of said second member adjacent the aperture, whereby when said screw is tightened in said nut said first member is clamped to said second member with at least a part of said first and second member rim portions being held tightly against each other.

4. The device as recited in claim 1 wherein one of said rim portions has corner sections located at the corners of its associated surface extending further from the surface than the remainder of said one of said rim portions.

5. The device as recited in claim 3 wherein said holding portion sides are inclined at angles of substantially 70 degrees and 110 degrees.

6. The device as recited in claim 5 wherein the angle of convergence of the sides of said holding portions along axes parallel to said surfaces is substantially equal to 60 degrees.

7. A mounting device comprising a first member having a holding portion extending from one of the surfaces of said member, said holding portion having at least two sides oppositely inclined with respect to said surface and running convergently with respect to each other along axes parallel to said surface, said holding portion having a section thereof joining said two sides, said joining section running substantially perpendicularly from said one surface of said first member, a second member having a holding portion and a surface similar to the holding portion and surface of said first member, and means for clamping said first member to said second member with one surface of each of the sides of the holding portion of said first member being held tightly against a corresponding surface of a side of the holding portion of said second member, said clamping means comprising female threaded means fixedly attached to said joining section of the holding portion of said first member, a screw operatively engaging said female threaded means, said second member having an extension with an open ended U-shaped aperture therein running perpendicularly from said similar surface thereof, the head of said screw applying force against one side of said extension of said second member, the body portion of said screw fitting within said extension aperture.

References Cited in the file of this patent

UNITED STATES PATENTS

| | | |
|---|---|---|
| 2,195,013 | Rastetter | Mar. 26, 1940 |
| 2,615,664 | Reeves | Oct. 28, 1952 |

UNITED STATES PATENT OFFICE
CERTIFICATION OF CORRECTION

Patent No. 2,962,135                 November 29, 1960

Arthur A. White

It is hereby certified that error appears in the above numbered patent requiring correction and that the said Letters Patent should read as corrected below.

Column 4, line 54, for the claim reference numeral "1" read -- 3 --.

Signed and sealed this 23rd day of May 1961.

(SEAL)
Attest:

ERNEST W. SWIDER                 DAVID L. LADD
Attesting Officer                 Commissioner of Patents